United States Patent
Tapti

(10) Patent No.: US 11,460,935 B2
(45) Date of Patent: Oct. 4, 2022

(54) USER CONTROL SYSTEM AND METHOD FOR CONTROLLING A VEHICLE

(71) Applicants: Hyundai Motor Company, Seoul (KR); Kia Corporation, Seoul (KR)

(72) Inventor: Firat Tapti, Eppertshausen (DE)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/307,538

(22) Filed: May 4, 2021

(65) Prior Publication Data
US 2022/0276725 A1 Sep. 1, 2022

(30) Foreign Application Priority Data

Mar. 1, 2021 (DE) .......................... 102021201924.2

(51) Int. Cl.
*G06F 3/0362* (2013.01)
*B60K 37/06* (2006.01)
*G05B 15/02* (2006.01)
*G06F 3/02* (2006.01)
*G06F 3/01* (2006.01)

(52) U.S. Cl.
CPC ............ *G06F 3/0362* (2013.01); *B60K 37/06* (2013.01); *G05B 15/02* (2013.01); *G06F 3/016* (2013.01); *G06F 3/0202* (2013.01); *G06F 3/0227* (2013.01)

(58) Field of Classification Search
CPC ...... G06F 3/0362; G06F 3/016; G06F 3/0202; G06F 3/0227; G05B 15/02; B60K 37/06
See application file for complete search history.

(56) References Cited

U.S. PATENT DOCUMENTS

| 6,504,528 B1 * | 1/2003 | Kermani | G06F 3/016 345/163 |
| 8,830,174 B1 * | 9/2014 | Rodoper | G06F 3/0221 345/169 |
| 2018/0154774 A1 * | 6/2018 | Park | G06F 3/017 |
| 2018/0373350 A1 * | 12/2018 | Rao | G06F 3/038 |
| 2019/0302904 A1 * | 10/2019 | Nieh | G06F 3/044 |
| 2020/0174587 A1 * | 6/2020 | Park | G06F 3/1423 |

FOREIGN PATENT DOCUMENTS

DE 10 2013 003 464 A1 9/2014

* cited by examiner

*Primary Examiner* — Ariel A Balaoing
(74) *Attorney, Agent, or Firm* — Fox Rothschild LLP

(57) ABSTRACT

A user control system for controlling a vehicle is provided. The system includes a control device having a control surface; and an operating element configured to receive control commands by a user and to wirelessly exchange control data with the control device to operate the vehicle according to the control commands. The operating element is releasably attached to the control surface via a contact surface. The operating element also has a user operable actuator configured to vary a holding force of the operating element on the control surface according to a user input such that the operating element is fixed in position at the control surface in a first configuration of the actuator, slidably attached to the control surface in a second configuration of the actuator and detachable from the control surface in a third configuration of the actuator.

15 Claims, 2 Drawing Sheets

USER CONTROL SYSTEM AND METHOD FOR CONTROLLING A VEHICLE

CROSS-REFERENCE TO RELATED APPLICATION

This application claims priority to and the benefit of German Patent Application No. 102021201924.2 filed in the German Intellectual Property Office on Mar. 1, 2021, the entire contents of which are incorporated herein by reference.

TECHNICAL FIELD

The present invention pertains to a user control system and a method for controlling a vehicle as well as a motor vehicle with such a user control system.

BACKGROUND

Modern motor vehicles are provided with an ever-increasing number of control functions, which allow the driver and/or the operator to control the vehicle and/or electronic equipment of the vehicle. With the advancement of advanced driver-assistance systems, motor vehicles have also been increasingly connected with sensors and telematics to implement assisted and/or autonomous driving functionalities. In light of these developments, new control concepts may be beneficial that allow operating these various new functionalities in a convenient and flexible way.

The related art provides an input device having a flexible layer with an input surface that is provided with a surface form, several movable magnetizable or magnetized elements and a magnetic field source. The magnetic field source is configured to generate a magnetic force on the magnetizable or magnetic elements, wherein the position of the magnetizable or magnetic elements is changed with respect to the input surface so that the surface form of the input surface of the flexible layer is changed to produce local differences in height and at least one input location.

Another related art provides an electronic device with one or more buttons that are mechanically coupled to actuators utilizing electroactive polymers. When active, the electroactive polymer deploys the button such that a height of the button above a substrate is increased.

SUMMARY

Based on the above described related art, there is a need to find adaptable solutions with a high grade of flexibility to control a vehicle. Accordingly, the present invention provides a user control system.

According to one aspect of the invention, a user control system for controlling a vehicle, in particular a motor vehicle, may include a control device having a control surface; and an operating element configured to receive control commands by a user and to wirelessly exchange control data with the control device to operate the vehicle according to the control commands. The operating element is releasably attached to the control surface via a contact surface, the operating element having a user operable actuator configured to vary a holding force of the operating element on the control surface according to a user input to fix the operating element in position at the control surface in a first configuration of the actuator, slidably attached to the control surface in a second configuration of the actuator and detachable from the control surface in a third configuration of the actuator. According to another aspect of the invention, a motor vehicle comprises a user control system according to the invention.

According to yet another aspect of the invention, a method for controlling a vehicle, in particular a motor vehicle may include receiving control commands with an operating element from a user and wirelessly exchanging control data between the operating element and the control device to operate the vehicle according to the control commands. The operating element is releasably attached to the control surface via a contact surface; and varying a holding force of the operating element on the control surface with a user operable actuator according to a user input to fix the operating element in position at the control surface in a first configuration of the actuator, slidably attached to the control surface in a second configuration of the actuator and detachable from the control surface in a third configuration of the actuator.

One idea of the present invention is to provide a hybrid solution with a free-floating and detachable mechanical operating element to increase flexibility and adaptability of the control system. The operating element of the invention may be positioned at basically any location on top of the control surface. In addition, the operating element may be completely removed from the control surface. The possibility to individually position the operating element on the control surface results in better ergonomics and usage of the operating element. When the control surface is a display or is part of a display, the maximal possible size of the respective display may be used as a further advantage, thereby increasing operability of the system. The invention provides a unique combination of technologies for smart surfaces, which enables easy and safe usage of control devices like control panels and other surfaces. Furthermore, the present solution satisfies customer demands for new adaptable operating elements.

According to an embodiment of the invention, the control device may further include a magnet layer arranged underneath the control surface. The operating element may include an integrated metal sheet above the contact surface at a height adjustable by the actuator such that a magnetic force exerted by the magnet layer on the metal sheet acts as holding force on the operating element, the holding force varying according to the height of the metal sheet above the contact surface.

The above exemplary embodiment provides a very elegant, simple yet robust mechanism to realize the three different configurations of the actuator. The solution may be implemented on a small scale and on basically any type of surface. The person of skill will readily other configurations, where variable electromagnetic forces may be used to attach the operating element to the control surface in different configurations.

According to an exemplary embodiment of the invention, the actuator may be a piezo actuator. A piezo actuator converts electrical energy directly into mechanical energy and vice versa and allows for motions on very small ranges, even down to the nanometer range and below. The actuator may be realized by using a slim bending plate as piezo element, which bends under the application of an electric current and thereby pushes the metal sheet away from the contact surface, thus increasing the height of the metal sheet and decreasing the corresponding magnetic holding force. The piezoelectric effect is related to electric fields, which means that piezo actuators do not produce relevant magnetic fields nor are they affected by them. Thus, the magnetic holding force is not affected by the piezo element of the actuator in any relevant way but is solely defined by the height of the metal sheet as set by the actuator.

According to an exemplary embodiment of the invention, the operating element may be a knob having a push button to operate the actuator. The size of a pressing force exerted by the user on the push button may set the configuration of the actuator. For example, the operating element may be configured as a center control knob or the like and/or may comprise such a device, as they are commonly used in various vehicles for controlling certain aspects of the vehicle. According to an exemplary embodiment of the invention, the actuator may be configured to generate haptic feedback to the user in response to a pressing force by the user.

The system thus provides an interface with real haptic feedback. The system may offer feedback on the pressing force and the correspondingly chosen configuration of the actuator by providing appropriate haptic response. Moreover, the push button does not necessarily need to be realized as a mechanical device but may merely provide an electronically generated haptic response, thereby reproducing the touch and feel of a mechanical button. The different configurations may be chosen by pressing the button with different pressures, pressing the button once or several times shortly after each other and/or pressing the button for different periods of time, for example. The haptic approach then may provide the reassurance that the button was indeed pushed and that a certain configuration was set.

According to an exemplary embodiment of the invention, the operating element may be configured to use near-field communication (NFC) to exchange the control data with the control device and/or to wirelessly receive electric power from the control device. The operating element may thus be wirelessly charged via the control device, e.g. while being arranged anywhere on top of the control surface, e.g. on a section of the control surface specifically reserved for this purpose.

According to an exemplary embodiment of the invention, the control surface may include a display section configured to display control information of the vehicle. The operating element in this case may also be used to operate and/or use the display, for example, which may be configured as a touchscreen displaying not only data and information but may also provide control functions, icons, apps etc.

According to an exemplar embodiment of the invention, the display section may be configured to adapt the displayed control information according to a position of the operating element on the display section. For example, the operating element may be disposed anywhere on the display section. Depending on the current position of the operating element the display may then adapt its configuration automatically, e.g. to make sure that displayed information, icons, control areas and on the like are not covered by the operating element. In one particular example, displayed data and/or control icons may be rearranged and/or shifted across the display section to a position not covered by the operating element. In another example, the whole displayed information may be shifted across the control surface according to the movement of the operating element to a more convenient position indicated by the movement of the operating element.

According to an exemplary embodiment of the invention, the control device may be configured as a surface of a control panel, a display, a dashboard, a center console, an armrest and/or a steering wheel. In general, any surface of the vehicle's interior may be used as a control surface and may be provided with a display section. This is possible as long as the operating element, the magnet layer and the further components of the present system fit on and/or beneath the respective surface.

The invention will be explained in greater detail with reference to exemplary embodiments depicted in the drawings as appended.

BRIEF DESCRIPTION OF THE DRAWINGS

The accompanying drawings are included to provide a further understanding of the present invention and are incorporated in and constitute a part of this specification. The drawings illustrate the exemplary embodiments of the present invention and together with the description serve to explain the principles of the invention. Other exemplary embodiments of the present invention and many of the intended advantages of the present invention will be readily appreciated as they become better understood by reference to the following detailed description. The elements of the drawings are not necessarily to scale relative to each other. In the figures, like reference numerals denote like or functionally like components, unless indicated otherwise.

Figure 1:
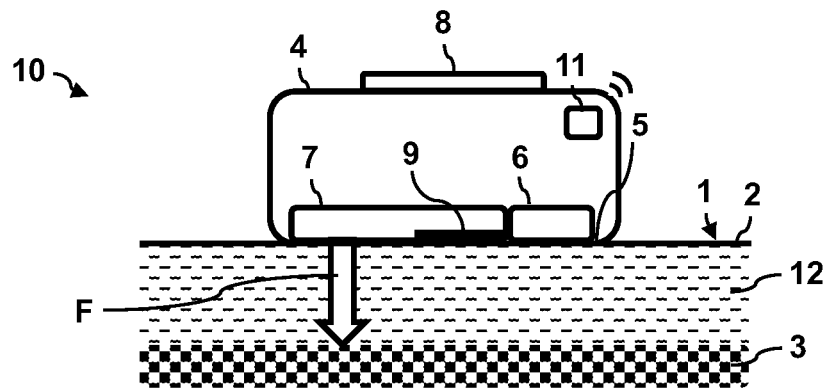
FIG. 1 schematically shows a cross sectional view of a user control system according to an exemplary embodiment of the invention in a first configuration.

Although specific embodiments are illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 2:
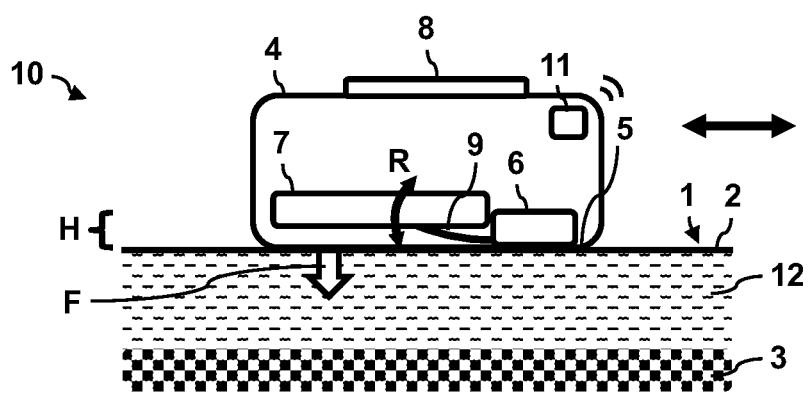
FIG. 2 shows the system of FIG. 1 in a second configuration.
Figure 9:
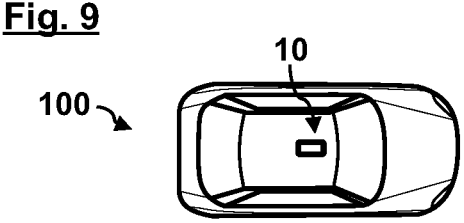
FIG. 9 shows a motor vehicle with the system of FIGS. 1 to 7.

FIGS. 1 and 2 schematically show cross sectional views of a user control system 10 according to an exemplary embodiment of the invention. The user control system 10 may be integrated into a motor vehicle 100 as exemplary shown in FIG. 9, e.g. a car. The user control system 10 is configured to control various functions of the motor vehicle 100 comprising without limitation on-board computers, in-vehicle entertainment, heating, ventilation and air conditioning (HVAC), navigation systems, telecommunication systems and seat adjustment.

Accordingly, the user control system 10 provides a control device 1 with a control surface 2, on which a standalone and movable operating element 4 is arranged that, depending on a current configuration as set by a user, may either be fixed in position on top of the control surface 2 or, alternatively, be pushed across the control surface 2 or even be raised from the surface 2 entirely, as will be explained in the following.

The user control system 10 is provided to increase the usability of common control systems and to enable easy operation through a movable operating element that may be rearranged on the control surface 2 at will, thereby achieving improved operability. More specifically, the control device 1 has a control surface 2, which in the present example is configured as a display 12 configured to display control information of the motor vehicle 100. For example, the display 12 may be a touchscreen based on LCD or OLED technology or similar, and thus, a user may provide input or request information through simple or multi-touch gestures by touching the screen with a special stylus or one or more fingers. Accordingly, the display 12 may be divided into several sections and may be configured to display several interactive icons that fulfill various functions, as commonly known to the person of skill.

The operating element 4 may be configured to receive control commands by the user and to wirelessly exchange control data with the control device 1 to operate the vehicle according to the control commands. For this purpose, the operating element 4 may include a communication unit 11 configured to use near-field communication (NFC) or similar to exchange the control data with the control device 1. Based on such a technology, the operating element 2 may also be wirelessly charged on top of the control surface 2.

Furthermore, the operating element 4 may be releasably attached to the control surface 2 via a contact surface 5. In this regard, the operating element 4 may include a piezo actuator 6 configured to vary a holding force F of the operating element 4 on the control surface 2 according to a user input to fix the operating element 4 in position at the control surface 2 in a first configuration of the actuator 6 and slidably attached to the control surface 2 in a second configuration of the actuator 6. The first configuration is shown in FIG. 1, while the second configuration is depicted by FIG. 2.

The control device 1 may include a magnet layer 3 arranged underneath the control surface 2. A metal sheet 7 is integrated above the contact surface 5 of the operating element 4, on which a magnetic force is exerted by the magnet layer 3. The actuator 6 is now configured to adjust a height H of the metal sheet above the contact surface 5 to adjust the magnitude of the magnetic force acting on the metal sheet 7. Accordingly, the actuator 6 has a thin piezo element 9 attached underneath the metal sheet 7 that bends under application of an electric current to push the metal sheet 7 upwards based on the electric current introduced into the piezo element 9. Hence, by adjusting the electric current appropriately a rotation angle R of the piezo element 9 and thus the corresponding elevation of the metal sheet 7 and the height H thereof may be set. Varying the height H of the metal sheet 7 however affects the magnitude of the magnetic force acting on the metal sheet, which presently provides the holding force F pressing the operating element 4 at the contact surface 5 against the control surface 2.

By carefully configuring the magnet layer 3 and its distance to the metal sheet 7, the actuator configuration may be changed between a situation where the operating element 4 is pushed rather rigorously against the control surface, thereby effectively fixing the position of the operating element 4 on the control surface 2, and a case where the holding force F is rather weak such that a sliding movement of the operating element 4 along the control surface 2 may be performed by a user by pushing the operating element 4 across the surface.

Figure 3:
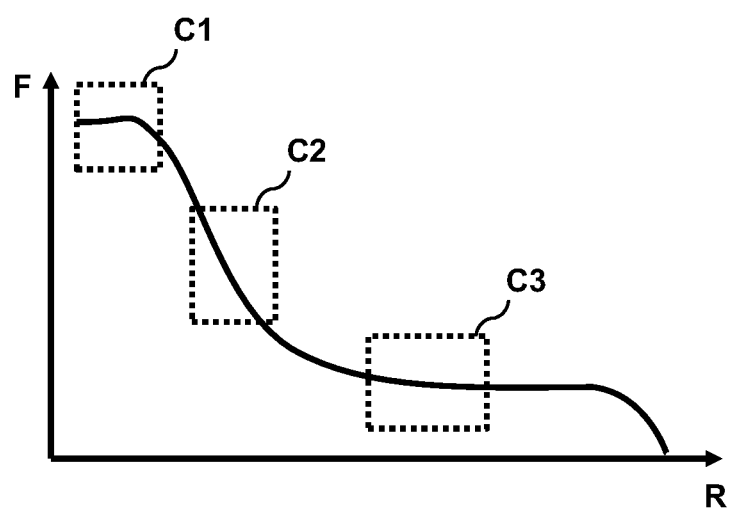
FIG. 3 shows the holding force of an operating element on a control surface of the system of FIGS. 1 and 2 for different configurations.

In principle, also a third configuration C3 may be reached by further increasing the height H of the metal sheet 7 and thereby further reducing the magnitude of the magnet force acting on it. This is exemplified by the graphical depiction in FIG. 3, which shows the holding force F as a function of rotation angle R of the piezo element 9, which in turn directly corresponds to the elevation of the metal sheet 7 and thus the height H. By increasing the rotation angle R, the holding force F may be reduced continuously. First, starting at C1 in FIG. 3, the operating element 4 may be fixed to the control surface 2 in the first configuration. After a certain reduction of the holding force, the second configuration is reached at C2, where the operating element 4 may now be slid across the control surface 2. Finally, at C3, the holding force F becomes so weak that the operating element 4 may be detached easily by the user from the control surface 2.

Figure 8:
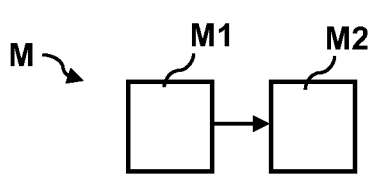
FIG. 8 shows a flow diagram of a method for controlling a vehicle with the system of FIGS. 1 to 7.

The corresponding method M is shown as a schematic flow diagram in FIG. 8 and may include under M1 receiving control commands with the operating element 4 from a user and wirelessly exchanging control data between the operating element 4 and the control device 1 to operate the vehicle according to the control commands. The method M may further include under M2 varying the holding force F of the operating element 4 on the control surface 2 with the actuator 6 according to a user input such that the operating element 4 is fixed in position at the control surface 2 in a first configuration of the actuator 6, slidably attached to the control surface 2 in a second configuration of the actuator 6 and detachable from the control surface 2 in a third configuration of the actuator.

Referring to FIGS. 4 to 7, different exemplary configurations of the user control system 10 are shown. In particular, as shown, the operating element 4 is configured as a knob having a push button 8 to operate the actuator 6, wherein the size of a pressing force exerted by the user on the push button 8 sets the configuration of the actuator 6. The push button 8 may be a mechanical button in some exemplary embodiments. In other exemplary embodiments, the button 8 may provide haptic feedback to the user in response to a pressing force exerted by the user, thereby eliminating the need to push down a mechanical button.

Figure 4:
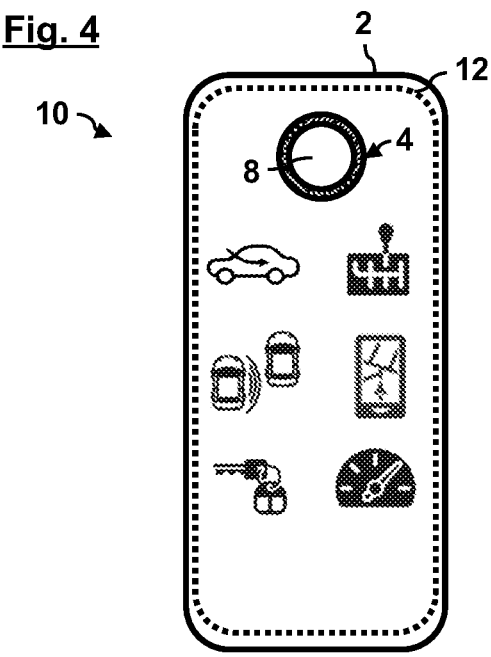
FIGS. 4 to 7 schematically depict a top view of the system of FIGS. 1 and 2 in various configurations.

FIG. 4 may for example depict a default configuration, in which the display section 12 displays various information, fields and/or functional icons. In this configuration, the operating element 4 may be fixed to the control surface 2.

Figure 5:
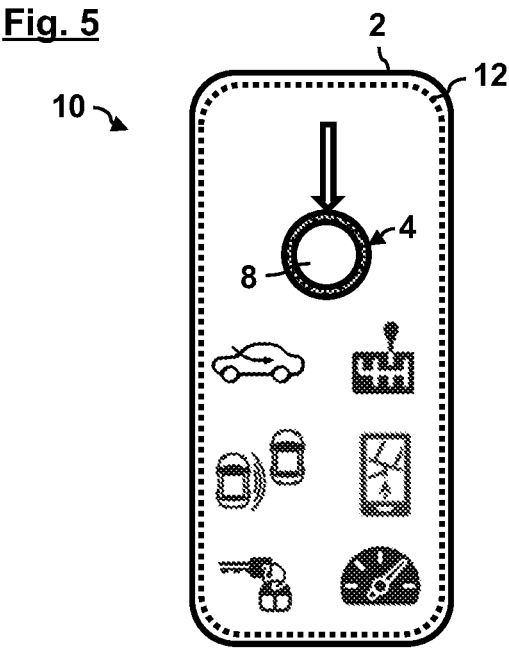

Referring to FIG. 5, a user may now push the button 8 such that the actuator 6 enters the second configuration, in which the operating elements 4 becomes slidable across the control surface 2. As shown in FIG. 5, the user pushes the operating element 4 downwards, e.g. to adjust the position and orientation of the displayed information and/or the control elements in a convenient way. The control device 1 may be configured such that the displayed information and icons follow the movement of the operating element 4 downwards.

Figure 6:
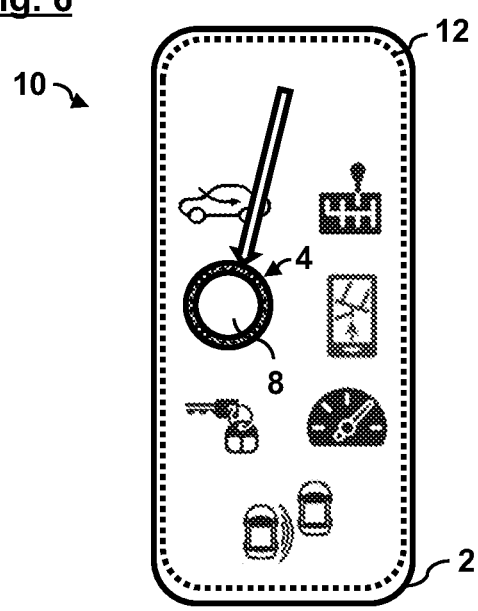

The display 12 may also be configured to rearrange the displayed control information according to a position of the operating element 4 on the display section. FIG. 6 shows an example, in which the operating element 4 is pushed to the lower left, thereby obstructing one of the functional fields on the display. In order to avoid this, the display 12 may be configured to automatically rearrange the displayed information, e.g. by moving the respective field or icon to a different position unblocked from view.

Figure 7:
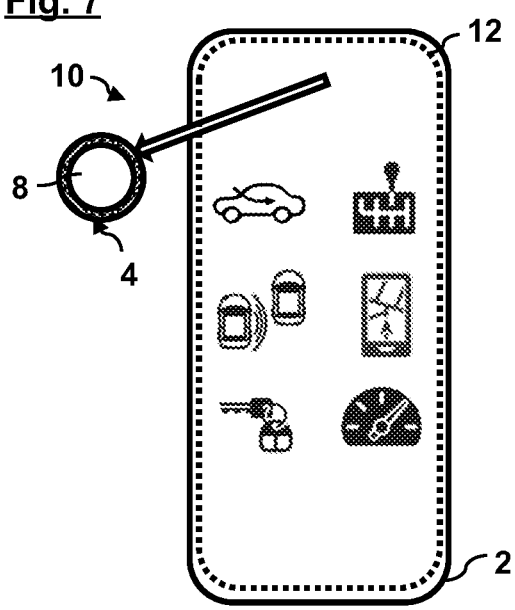

In the example of FIG. 7, the user removes the operating element 4 completely from the control surface 2 by operating the push button 8 accordingly. The operating element 4 may still be used in this situation, e.g. contactless via wireless data exchange. In principle, it may be possible to attach the operating element 4 to the control surface 2 of a different control device 1. For example, the operating element could be selectively used with a first control device of a vehicle operator and with a second control device of a passenger.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents of the different features and embodiments. Many other examples will be apparent to one skilled in the art upon reviewing the above specification. The embodiments were chosen and described in order to explain the principles of the invention and its practical applications, to thereby enable others skilled in the art to utilize the invention and various exemplary embodiments with various modifications as are suited to the particular use contemplated.

REFERENCE LIST 1 control device
2 control surface
3 magnet layer
4 operating element
5 contact surface
6 actuator
7 metal sheet
8 push button
9 piezo element
10 user control system
11 communication unit
12 display section
100 motor vehicle
F holding force
H height
R rotation angle
C1 first configuration
C2 second configuration
C3 third configuration
M method
M1, M2 method steps

What is claimed is:

1. A user control system for operating a vehicle, comprising:
    a control device having a control surface and further comprising a magnet layer arranged underneath the control surface; and
    an operating element configured to receive control commands input by a user and to wirelessly exchange control data with the control device to operating the vehicle according to the control commands,
    wherein the operating element is releasably attached to the control surface via a contact surface, the operating element having a user operable actuator configured to vary a holding force of the operating element on the control surface according to a user input to fix the operating element in position at the control surface in a first configuration of the actuator, slidably attached to the control surface in a second configuration of the actuator and detachable from the control surface in a third configuration of the actuator; and
    wherein the operating element comprises an integrated metal sheet above the contact surface at a height adjustable by the actuator such that magnetic force exerted by the magnet layer on the metal sheet acts as holding force on the operating element, the holding force varying according to the height of the metal sheet above the contact surface.

2. The user control system according to claim 1, wherein the actuator is a piezo actuator.

3. The user control system according to claim 1, wherein the operating element is configured as a knob having a push button to operate the actuator, wherein the size of a pressing force exerted by the user on the push button sets the configuration of the actuator.

4. The user control system according to claim 3, wherein the actuator is configured to generate haptic feedback to the user in response to a pressing force by the user.

5. The user control system according to claim 1, wherein the operating element is configured to use near-field communication, NFC, to exchange the control data with the control device and to wirelessly receive electric power from the control device.

6. The user control system according to claim 1, wherein the control surface includes a display section configured to display control information of the vehicle.

7. The user control system according to claim 6, wherein the display section is configured to adapt the displayed control information according to a position of the operating element on the display section.

8. The user control system according to claim 1, wherein the control device is configured as a surface of at least one of a control panel, a dashboard, a center console, an armrest and a steering wheel.

9. A motor vehicle with a user control system according to claim 1.

10. A method for operating a vehicle, comprising:
receiving control commands with an operating element from a user and wirelessly exchanging control data between the operating element and a control device to control the vehicle according to the control commands, wherein the operating element is configured to be releasably attached to a control surface of the control device via a contact surface; and
varying a holding force of the operating element on the control surface with a user operable actuator according to a user input such that the operating element is fixed in position at the control surface in a first configuration of the actuator, slidably attached to the control surface in a second configuration of the actuator, and detachable from the control surface in a third configuration of the actuator;
wherein the actuator adjusts a height of a metal sheet integrated in the operating element above the contact surface such that a magnetic force exerted by a magnet layer, being arranged underneath the control surface of the control device, on the metal sheet acts as holding force on the operating element, the holding force varying according to the height of the metal sheet above the contact surface.

11. The method according to claim 10, wherein the actuator is operated by a push button of the operating element, wherein the size of a pressing force exerted by the user on the push button sets the configuration of the actuator.

12. The method according to claim 11, wherein the actuator is configured to generate haptic feedback to the user in response to a pressing force by the user.

13. The method according claim 10, wherein the actuator uses near-field communication, NFC, to exchange the control data with the control device and to wirelessly receive electric power from the control device.

14. The method according to claim 10, wherein the control surface includes a display section configured to display control information of the vehicle.

15. The method according to claim 14, wherein the display section adapts the displayed control information according to a position of the operating element on the display section.

* * * * *